US010883231B2

(12) United States Patent
Völkel et al.

(10) Patent No.: US 10,883,231 B2
(45) Date of Patent: Jan. 5, 2021

(54) CONSTRUCTION MACHINE

(71) Applicant: Hamm AG, Tirschenreuth (DE)

(72) Inventors: Werner Völkel, Neustadt (DE); Stefan Braunschläger, Bärnau (DE)

(73) Assignee: HAMM AG, Tirschenreuth (DE)

( * ) Notice: Subject to any disclaimer, the term of this patent is extended or adjusted under 35 U.S.C. 154(b) by 0 days.

(21) Appl. No.: 16/349,066

(22) PCT Filed: Nov. 10, 2017

(86) PCT No.: PCT/EP2017/078829
§ 371 (c)(1),
(2) Date: May 10, 2019

(87) PCT Pub. No.: WO2018/087265
PCT Pub. Date: May 17, 2018

(65) Prior Publication Data
US 2019/0276991 A1 Sep. 12, 2019

(30) Foreign Application Priority Data
Nov. 14, 2016 (DE) .................. 10 2016 121 724

(51) Int. Cl.
E01C 19/23 (2006.01)
H02J 50/12 (2016.01)
E01C 19/28 (2006.01)
(52) U.S. Cl.
CPC .......... E01C 19/233 (2013.01); E01C 19/286 (2013.01); H02J 50/12 (2016.02)
(58) Field of Classification Search
CPC ....... E01C 19/233; E01C 19/286; H02J 50/12

USPC .......................................... 404/117, 122–132
See application file for complete search history.

(56) References Cited

U.S. PATENT DOCUMENTS

| 4,734,846 | A | * | 3/1988 | Konig | G05D 19/02 |
|  |  |  |  |  | 404/117 |
| 7,211,986 | B1 |  | 5/2007 | Flowerdew et al. |  |
| 9,725,879 | B2 | * | 8/2017 | Bystedt | B60L 15/20 |
| 10,163,564 | B2 | * | 12/2018 | Bae | H02J 50/80 |
| 10,343,534 | B2 | * | 7/2019 | Fischperer | B60L 53/22 |

(Continued)

FOREIGN PATENT DOCUMENTS

DE 10 2011 080973 2/2013
DE 102011080973 2/2013

(Continued)

OTHER PUBLICATIONS

International Preliminary Report on Patentability of PCT/EP2017/078829 dated May 23, 2019, 9 pages.

(Continued)

Primary Examiner — Raymond W Addie
(74) Attorney, Agent, or Firm — Rankin, Hill & Clark LLP

(57) ABSTRACT

A construction machine comprises: a system region that can be rotated about an axis of rotation relative to a machine frame; at least one electrical load (50) in the rotatable system region; and an induction energy-transfer assembly (26) for wirelessly transferring energy into the rotatable system region, the induction energy-transfer assembly (26) comprising a transmitting assembly (27) having at least one transmitting coil (28, 30) and, in the rotatable system region, a receiving assembly (32) having at least one receiving coil (34).

14 Claims, 3 Drawing Sheets

(56) References Cited

U.S. PATENT DOCUMENTS

Figure 1:
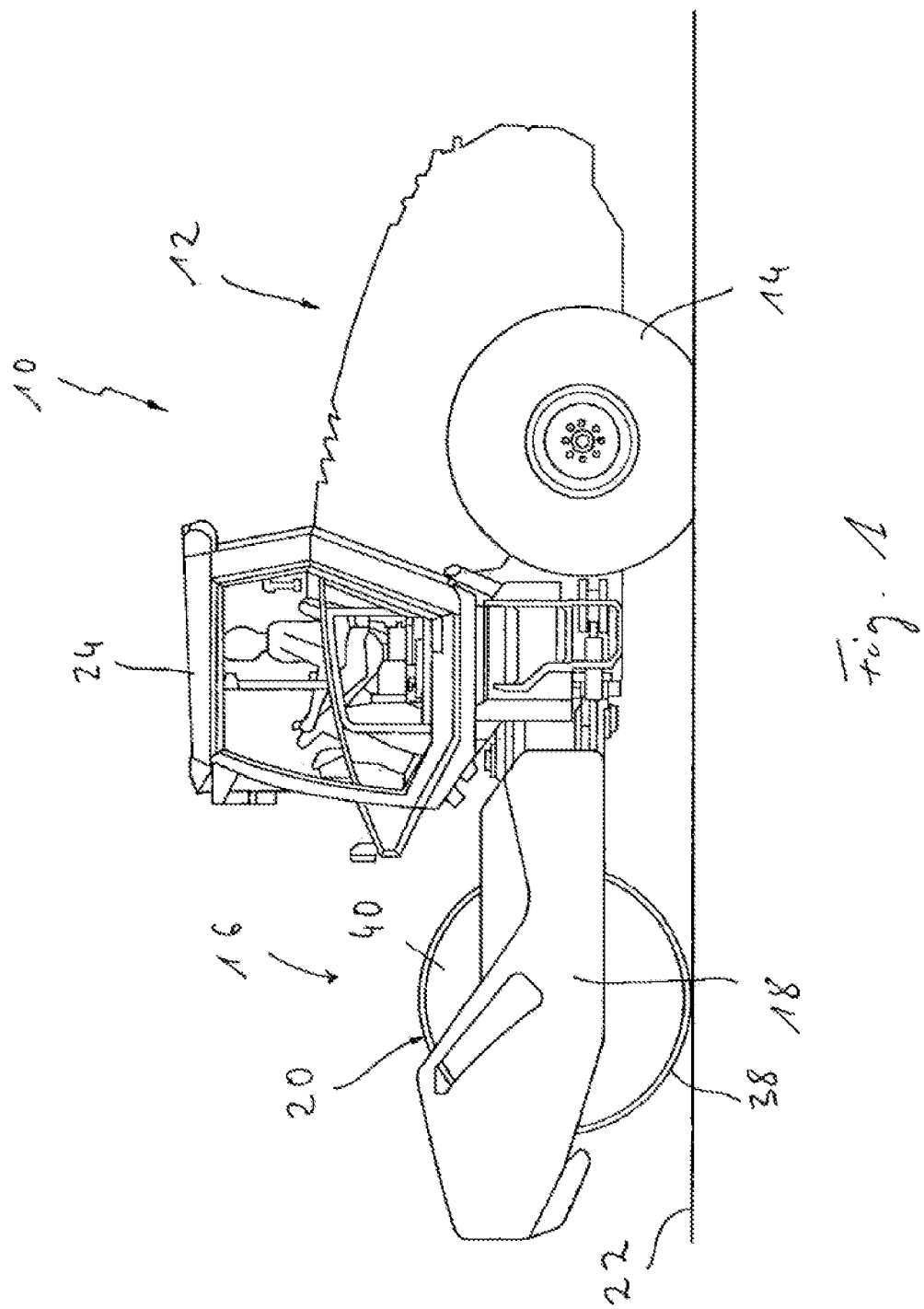

| | | | | |
|---|---|---|---|---|
| 2003/0108389 | A1* | 6/2003 | Codina | E01C 19/286 |
| | | | | 404/117 |
| 2004/0009039 | A1* | 1/2004 | Corcoran | E02D 3/026 |
| | | | | 404/117 |
| 2013/0234507 | A1* | 9/2013 | Kim | E02F 9/2091 |
| | | | | 307/9.1 |
| 2014/0341650 | A1 | 11/2014 | Villwock et al. | |
| 2017/0222493 | A1 | 8/2017 | Oki et al. | |
| 2018/0163350 | A1* | 6/2018 | Volkel | E01C 19/282 |
| 2019/0267842 | A1* | 8/2019 | Richter | H01F 27/245 |
| 2019/0366866 | A1* | 12/2019 | Cha | H02J 50/90 |

FOREIGN PATENT DOCUMENTS

| | | |
|---|---|---|
| EP | 2 645 533 | 10/2013 |
| EP | 2645533 | 10/2013 |
| JP | 2011-101485 | 5/2011 |
| JP | 2013-121230 | 6/2013 |
| JP | 2014-505185 | 2/2014 |
| KR | 2013 0064872 | 6/2013 |
| KR | 20130064872 | 6/2013 |
| KR | 1020130135251 | 12/2013 |
| WO | 2012099965 | 7/2012 |
| WO | 2014152004 | 9/2014 |
| WO | WO2016051484 | 4/2016 |
| WO | 2017033585 | 3/2017 |

OTHER PUBLICATIONS

German Search Report of DE 10 2016 121 724.7 dated Aug. 30, 2017. 10 pages (German).
Written Opinion and International Search Report of PCT/EP2017/078829 dated Feb. 19, 2018, 17 pages, (English and German).
Japanese Office Action of Serial No. 2019-519312 dated Feb. 17, 2020, 5 pages.
Indian Office Action of Serial No. 201937018395 dated May 29, 2020, 6 pages (English and Indian).
European Office Action of Serial No. 17 797 625.5 dated Apr. 14, 2020, 4 pages.

* cited by examiner

CONSTRUCTION MACHINE

The present invention relates to a construction machine, such as a soil compactor for compacting the ground.

DE 10 2011 088 576 A1 discloses a soil compactor, which has a compactor roller, which is supported on a machine frame for rotation about an axis of rotation. Within the compactor roller, a sensor system is provided for providing information about the motion state of the compactor roller, which sensor system comprises a plurality of acceleration sensors and a radio signal transfer assembly for transferring output signals of the sensors to a signal receiving unit, which is supported fixedly relative to the machine frame. The sensors and the radio signal transfer assembly are electrical loads, which are supplied by an energy converter unit, which is provided within the compactor roller and which generates electrical energy from the motion of the compactor roller.

The problem addressed by the present invention is that of providing a construction machine, such as a soil compactor having a compactor roller that is rotatably supported on a machine frame, in which construction machine it can be ensured that energy is efficiently supplied to at least one electrical load provided in a rotatable system region of the construction machine.

This problem is solved according to the invention by means of a construction machine comprising: a system region that can be rotated about an axis of rotation relative to a machine frame; at least one electrical load in the rotatable system region; and an induction energy-transfer assembly for wirelessly transferring energy into the rotatable system region, the induction energy-transfer assembly comprising a transmitting assembly having at least one transmitting coil and, in the rotatable system region, a receiving assembly having at least one receiving coil.

The present invention uses the effect of magnetic induction in order to transfer energy from a transmitting assembly, which is substantially fixed relative to a machine frame, to a receiving assembly, which is provided in the rotating system region. The transmitting assembly can be connected to a vehicle voltage system, such as a 12-V voltage system of the construction machine, so that in principle a reliable feed of electrical energy is provided.

In order to be able to use, in the rotating system region, loads generally supplied with a direct voltage, it is proposed that, in association with each receiving coil, a rectifier is provided for providing a direct voltage.

The occurrence of voltage fluctuations during the rotational operation of the rotatable system region can be reduced or largely eliminated in that the receiving assembly comprises a plurality of receiving coils, which are preferably arranged one after the other in the circumferential direction around the axis of rotation. In particular, the receiving coils can be connected to at least one electrical load in parallel.

A substantially constant output voltage in the region of the receiving assembly can also be ensured in that the transmitting assembly comprises at least two transmitting coils preferably arranged one after the other in the circumferential direction around the axis of rotation.

In order to be able to generate the alternating voltage required for the transfer of energy by means of magnetic induction or the required alternating current from the supply voltage, which is generally in the form of a direct voltage in a construction machine, it is proposed that the transmitting assembly comprises a frequency generator for converting a direct voltage applied to an input of the frequency generator into an alternating voltage to be applied to at least one transmitting coil.

Furthermore, in association with each transmitting coil, a core around at least part of which the transmitting coil extends and which is preferably made of metal material can be provided, in order to achieve efficient energy transfer.

In order to efficiently transfer energy into the receiving assembly by magnetic interaction by using such a core, it is proposed that the core is E-shaped or U-shaped, and that the transmitting coil extends around at least part of an E leg and/or E web or a U leg and/or U web of the core.

The efficiency of the induction energy-transfer assembly to be provided according to the invention can be considerably increased if, in association with at least one transmitting coil, a resonant circuit is provided. Such a resonant circuit can comprise a resonant circuit coil and a resonant circuit capacitor, the resonant circuit coil preferably being arranged so as to extend around at least part of the core.

In order to utilize the amplifying effect generated by such a resonant circuit as efficiently as possible, it is proposed that a resonance frequency of the resonant circuit is in the range of the frequency of the alternating voltage produced by the frequency generator. For example, the frequency of the frequency generator can be tunable for this purpose. Alternatively or additionally, the resonance frequency of the resonant circuit can be tunable.

The principles of the present invention can be used particularly efficiently if the construction machine is a soil compactor and the rotatable system region is a compactor roller. In a compactor roller, information about the motion state, for example an acceleration in the circumferential direction or in the vertical direction, is advantageously generated so that the compaction state of ground to be compacted can be inferred from said information. Because, according to the invention, electrical energy is to be coupled in by magnetic induction, it is ensured that electrical loads arranged in such a compactor roller are reliably and nevertheless wirelessly supplied from the vehicle voltage system of a soil compactor.

Figure 2:
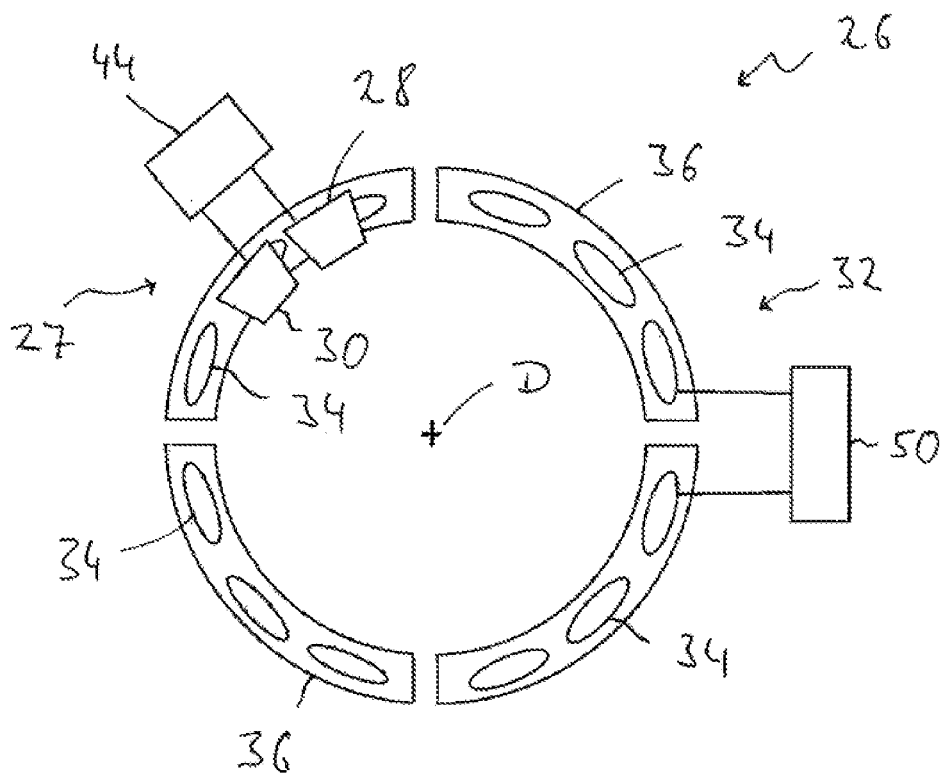
Figure 3:
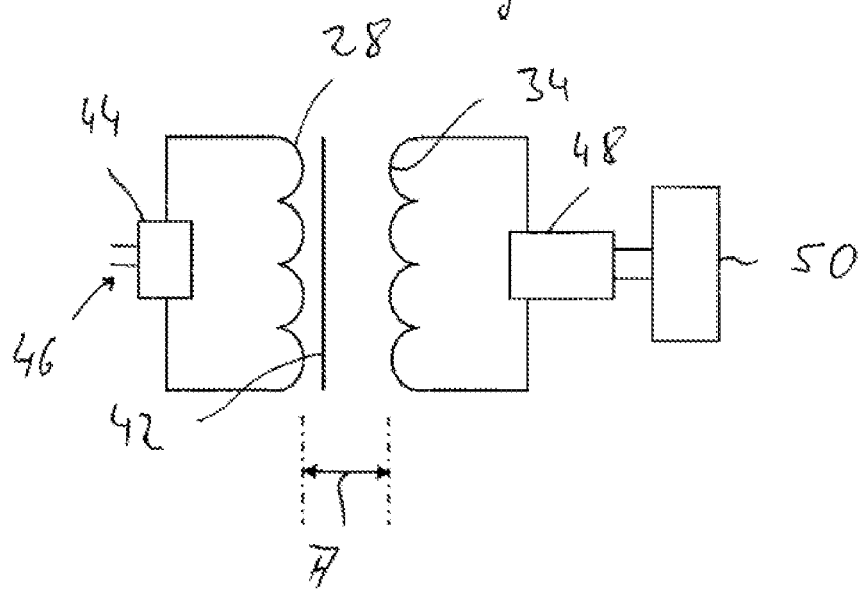
Figure 4:
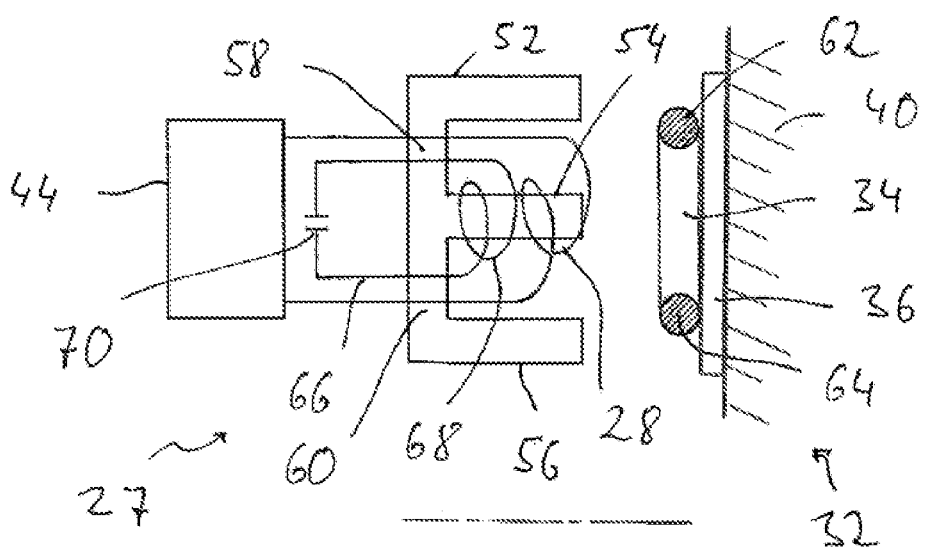

The present invention is described in detail below with reference to the enclosed figures. The figures show:

FIG. 1 a soil compactor;

FIG. 2 a schematic illustration of an induction energy-transfer assembly provided in association with a compactor roller of the soil compactor of FIG. 1;

FIG. 3 a schematic illustration of the interaction of a transmitting coil with a receiving coil;

FIG. 4 the basic design of the transmitting assembly, with a transmitting coil and a resonant circuit associated with the transmitting coil.

In FIG. 1, a construction machine in the form of a soil compactor 10 is shown in a side view. The soil compactor 10 comprises a rear end 12 having drive wheels 14, which are driven by a drive unit also provided there. A front end 16, which can be pivoted relative to the rear end 12, comprises a machine frame 18, on which a compactor roller 20 can be rotated about an axis of rotation substantially orthogonal to the drawing plane of FIG. 1, in order to compact ground 22 as the soil compactor 10 moves forward.

Various mechanisms can be provided within the compactor roller 20 in order to generate an oscillatory motion or a vibrational motion in addition to the rolling motion of said compactor roller. In order to sense the motion state of the compactor roller 20, motion sensors, such as acceleration sensors, can be provided within said compactor roller, the motion sensors being connected to a radio transfer unit in order to transmit information about the motion state of the compactor roller to a receiving unit arranged, for example, in the region of an operator cab 24 on the rear end 12. The sensors arranged within the compactor roller 20 and the radio transfer unit are electrical loads that must be supplied with electrical energy in order to provide the sensor signals and in order to transfer said sensor signals as radio signals, respectively.

Below, with reference to FIGS. 2 to 4, it is described how such electrical loads in a rotating system region, i.e. in the compactor roller 20 of the soil compactor 10 presented as an example, can be supplied with electrical energy in accordance with the principles of the present invention.

In the presented example, an induction energy-transfer assembly 26 according to the invention, which is illustrated largely schematically in FIGS. 2 to 4, comprises a transmitting assembly 27 having two transmitting coils 28, 30. These are borne, for example fixedly relative to the machine frame 18, on an assembly that cannot be rotated with the rotatable system region, i.e. with the compactor roller 20. The two transmitting coils 28, 30 can be arranged in such a way that said transmitting coils are arranged one after the other in the circumferential direction around the axis of rotation of the rotatable system region, i.e. the compactor roller 20.

A receiving assembly labeled as a whole with 32 is provided in the rotating system region, i.e. in the presented example the compactor roller 20. Said receiving assembly comprises a plurality of receiving coils 34, which for example are likewise arranged one after the other in the circumferential direction around the axis of rotation D and which are elongate in the circumferential direction. In the presented example, three such receiving coils 34 are borne on each circle-segment-like carrier 36. The four circle-segment-like carriers 36 in total can be fixed in the circle-like configuration shown in FIG. 2 in the rotating system region, i.e. the compactor roller 20, for example on a disk 40 that axially closes off said compactor roller and that bears a roller shell 38. The receiving coils 34 are arranged in such a way with respect to the axis of rotation D that said receiving coils lie approximately in the radial region in which the transmitting coils 28, 30 are also positioned.

The interaction of the receiving coils 34 with the transmitting assembly 27 or the two transmitting coils 28, 30 of said transmitting assembly is described with reference to FIGS. 3 and 4.

FIG. 3 shows, as an example, the transmitting coil 28, which can have one or more turns extending around a schematically illustrated core 42 preferably made of metal material. The transmitting coil 28 is connected to a frequency generator 44, which can be connected, by means of an input region 46, to the vehicle voltage system of the soil compactor 10 and which is supplied, for example, with a 12-V direct voltage by said vehicle voltage system. The frequency generator 44 produces a high-frequency alternating voltage signal, e.g. having a frequency of around 100 kHz, from said direct voltage and applies said alternating voltage signal to the transmitting coil 28. Said transmitting coil produces, with amplification by the core 42, a correspondingly high-frequency alternating magnetic field, which induces a corresponding alternating voltage and a corresponding alternating current in the receiving coil 34, which in FIG. 3 lies opposite the transmitting coil 28. A rectifier 48 associated with the receiving coil 34 produces from said alternating voltage a direct voltage, for example likewise at 12 V, which can be applied to the one or more electrical loads 50 provided in the compactor roller 20, in order to supply said one or more electrical loads with electrical energy.

During rotation of the compactor roller 20, the receiving coils 34 following one another in the circumferential direction move, in succession, past the one or more transmitting coils 28, 30 at a distance A of approximately 20 mm left in the direction of the axis of rotation D. During each phase in which one or more of the receiving coils 34 are in magnetic interaction with the transmitting coils 28, 30, an alternating voltage and an alternating current are generated in the receiving coils 34 in question by magnetic induction. Because in association with each receiving coil 34 an independent rectifier 48 is provided and all the receiving coils 34 and the associated rectifiers 48 are connected in parallel with each other, the loads 50 are supplied substantially constantly even during rotational operation. In particular, this is partly due to the fact that the transmitting assembly 27 comprises a plurality of transmitting coils following one another in the circumferential direction, in the presented example two transmitting coils 28, 30, which are each in excitation interaction with the frequency generator 44, so that the circumferential range in which magnetic interaction between the transmitting assembly 27 and the receiving assembly 32 is generated is extended in such a way that at any given time at least one of the receiving coils 34 is excited by the alternating magnetic field to produce an alternating voltage.

FIG. 4 shows an example of the design of the transmitting coils 28, 30, for example the transmitting coil 28, and the interaction thereof with the associated core 42. In the presented example, said core 42, which is generally constructed of metal material, is E-shaped and has three E legs 52, 54, 56 and has E webs 58, 60 connecting said E legs. The transmitting coil 28 comprising one or more turns is wound around the middle E leg, i.e. E leg 54. The core 42 is arranged substantially in such a way that the E legs 52, 54, 56 are oriented approximately in the direction of the axis of rotation D and toward the compactor roller 20 and the receiving coils 34 provided thereon. The middle E leg 54 around which the transmitting coil 28 extends is preferably positioned in the radial direction in such a way that said middle E leg is positioned approximately centrally between a radially outer coil region 62 and a radially inner coil region 64 of a receiving coil 34 in question. The two outer E legs 52, 56 can be positioned approximately opposite said radially outer and radially inner coil regions 62, 64, respectively.

In this way, very efficient magnetic interaction between the transmitting coil 28 and the receiving coils 34 periodically moving past said transmitting coil is ensured, said receiving coils 34 comprising one or more turns, which do not necessarily extend around a core.

In association with each transmitting coil 28, 30, an electrical resonant circuit 66 is preferably provided, in order to increase the efficiency of the energy transfer from the transmitting assembly 27 to the receiving assembly 32. Said resonant circuit comprises a closed electrical circuit, which has a resonant circuit coil 68 and a resonant circuit capacitor 70. The resonant circuit 66 therefore has a resonance frequency defined largely by the inductance of the resonant circuit coil 68 and by the capacitance of the resonant circuit capacitor 70. Said resonance frequency substantially corresponds to the frequency of the alternating voltage to be applied to the transmitting coil 28, which frequency is provided by the frequency generator 44. In order to enable tuning that is as exact as possible, for example the frequency of the generator 44 can be tunable, so that by slightly varying said frequency an adaptation to the resonance frequency of the resonant circuit 66 can be made. Alternatively or additionally, for example the capacitance of the resonant circuit capacitor 70 can be variable, in order to adapt the resonance frequency of the resonant circuit 66 to the alternating-voltage frequency provided by the frequency generator 44.

The resonant circuit coil 68 can be positioned in the immediate vicinity of the transmitting coil 28, said resonant circuit coil extending around the core 42. For example, said two coils can be arranged adjacent to each other, extending around the same region of the core 42, i.e. in the presented example around the middle E leg 54. In principle, one of the coils could also be arranged so as to extend around the other at the outer peripheral region thereof, so that a construction that is very compact in the direction of the axis of rotation can be achieved.

When the alternating voltage produced by the frequency generator 44 is applied to the transmitting coil 28, the resonant circuit 66 is excited to oscillation, the resonant circuit 66 oscillating at the resonance frequency thereof and thus at very high amplitude because of the frequency tuning discussed above. This amplifies the alternating magnetic field generated by the transmitting coil 28. By using such a resonant circuit 66 in association with each transmitting coil 28 or 30, the efficiency of the induction energy-transfer assembly can be increased to approximately 45%, so that at a power draw of the frequency generator 44 of approximately 15 W, the rectifiers 48 associated with the receiving coils 34 provide a power output of approximately 7 W.

It is noted that the induction energy-transfer assembly 26 shown in particular in FIGS. 2 to 4 substantially in schematic form can be varied in a wide range of aspects. For example, of course more or fewer than the shown receiving coils 34 can be arranged one after the other in the circumferential direction. Furthermore, radially graduated rings of receiving coils 34 following each other in the circumferential direction can be provided, said receiving coils preferably being offset to each other in the circumferential direction. And the number of transmitting coils of the transmitting assembly 27 can be varied, as can the design of the transmitting coils and the design of the cores interacting with said transmitting coils. For example, said cores do not necessarily have to be E-shaped. A U-shaped or substantially semicircular design of said cores can also be provided. The transmitting coils can, for example, also be provided on one of the outer E legs or in a web region connecting two E legs or two U legs.

The invention claimed is:

1. A soil compactor, comprising: a compactor roller providing a system region that can be rotated about an axis of rotation relative to a machine frame; at least one electrical load in the compactor roller; and an induction energy-transfer assembly for wirelessly transferring energy into the compactor roller, the induction energy-transfer assembly comprising a transmitting assembly having at least one transmitting coil and, in the compactor roller, a receiving assembly having at least one receiving coil.

2. The soil compactor according to claim 1, wherein, in association with each receiving coil, a rectifier is provided for providing a direct voltage.

3. The soil compactor according to claim 1, wherein the receiving assembly comprises a plurality of receiving coils.

4. The soil compactor according to claim 3, wherein the receiving coils are connected to at least one electrical load in parallel.

5. The soil compactor according to claim 3, wherein the plurality of receiving coils are arranged one after the other in the circumferential direction around the axis of rotation.

6. The soil compactor according to claim 1, wherein the transmitting assembly comprises at least two transmitting coils.

7. The soil compactor according to claim 6, wherein the at least two transmitting coils are arranged one after the other in the circumferential direction around the axis of rotation.

8. The soil compactor according to claim 1, wherein the transmitting assembly comprises a frequency generator for converting a direct voltage applied to an input of the frequency generator into an alternating voltage to be applied to at least one transmitting coil.

9. The soil compactor according to claim 8, wherein, in association with at least one transmitting coil, a resonant circuit is provided, and further wherein a resonance frequency of the resonant circuit is in the range of the frequency of the alternating voltage produced by the frequency generator.

10. The soil compactor according to claim 1, wherein, in association with each transmitting coil, a core around at least part of which the transmitting coil extends is provided.

11. The soil compactor according to claim 10, wherein the core is E-shaped or U-shaped and that the transmitting coil extends around at least part of an E leg and/or E web or a U leg and/or U web of the core.

12. The soil compactor according to claim 10, wherein, in association with at least one transmitting coil, a resonant circuit is provided, wherein the resonant circuit comprises a resonant circuit coil and a resonant circuit capacitor, and further wherein the resonant circuit coil is arranged so as to extend around at least part of the core.

13. The soil compactor according to claim 1, wherein, in association with at least one transmitting coil, a resonant circuit is provided.

14. The soil compactor according to claim 13, wherein the resonant circuit comprises a resonant circuit coil and a resonant circuit capacitor.

* * * * *